(12) United States Patent
Wang et al.

(10) Patent No.: US 10,322,634 B2
(45) Date of Patent: Jun. 18, 2019

(54) ESTIMATING BATTERY CAPACITY IN AN ELECTRIC VEHICLE

(71) Applicant: Ford Global Technologies, LLC, Dearborn, MI (US)

(72) Inventors: Xu Wang, Northville, MI (US); Chuan He, Northville, MI (US); Xiaoguang Chang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 650 days.

(21) Appl. No.: 14/882,873

(22) Filed: Oct. 14, 2015

(65) Prior Publication Data

US 2017/0106760 A1    Apr. 20, 2017

(51) Int. Cl.
*H01M 10/00* (2006.01)
*H01M 10/02* (2006.01)
*B60L 11/18* (2006.01)

(52) U.S. Cl.
CPC ....... *B60L 11/1809* (2013.01); *B60L 11/1861* (2013.01); *H01M 10/00* (2013.01); *H01M 10/02* (2013.01); *Y02T 10/705* (2013.01); *Y02T 10/7005* (2013.01); *Y02T 10/7044* (2013.01); *Y02T 10/7072* (2013.01); *Y02T 90/14* (2013.01)

(58) Field of Classification Search
None
See application file for complete search history.

(56) References Cited

U.S. PATENT DOCUMENTS

| | | | | |
|---|---|---|---|---|
| 6,495,989 | B1* | 12/2002 | Eguchi | H02J 7/0011 320/132 |
| 2001/0009371 | A1 | 7/2001 | Podrazhansky et al. | |
| 2007/0216361 | A1* | 9/2007 | Zelinski | H02J 7/0047 320/132 |
| 2010/0138178 | A1 | 6/2010 | Paryani et al. | |
| 2011/0285356 | A1* | 11/2011 | Maluf | H02J 7/0052 320/139 |
| 2012/0133369 | A1* | 5/2012 | Johnson | G01R 31/3648 324/427 |
| 2013/0110428 | A1* | 5/2013 | Sun | G01R 31/362 702/63 |
| 2014/0077815 | A1* | 3/2014 | Mattisson | G01R 31/361 324/426 |
| 2014/0103933 | A1* | 4/2014 | Gibbs | G01R 31/3634 324/427 |
| 2014/0249708 | A1 | 9/2014 | Li et al. | |

* cited by examiner

*Primary Examiner* — David V Henze-Gongola
(74) *Attorney, Agent, or Firm* — David B. Kelley; Brooks Kushman P.C.

(57) ABSTRACT

Vehicles that use electric power as a motive force may use accurate measurements of battery power for numerous purposes, e.g., battery characteristics, state of charge of the battery, travel distance remaining for the vehicle and the like. A traction battery measurement should be taken when the battery is fully relaxed, i.e., the battery is neither being charged nor providing power and a time period thereafter when the battery chemistry reaches a steady state. A controller or methods may determine if the battery is relaxed and if the battery is not relaxed, delay charging or discharging of the traction battery to allow accurate battery capacity determination. The controller may control a battery charger to ensure the battery is fully relaxed before sensing battery characteristics.

16 Claims, 5 Drawing Sheets

ESTIMATING BATTERY CAPACITY IN AN ELECTRIC VEHICLE

TECHNICAL FIELD

The present disclosure is generally directed to estimating battery capacity in an electric vehicle.

BACKGROUND

Vehicles that use electric power as a motive force rely on accurate measurements of battery capacity for numerous purposes, e.g., battery characteristics, battery state of charge, remaining vehicle travel distance, and the like. Control strategies for charging and discharging traction batteries for battery electric vehicles (BEV's) and plug-in hybrid electric vehicles (PHEV's) continue to evolve to enhance battery life and vehicle performance. Charging and discharging currents applied to the battery result in chemical reactions within the battery. Battery measurements taken before the battery chemistry has stabilized may lead to inaccurate determinations of various battery characteristics.

SUMMARY

To improve accuracy of battery capacity estimations, battery measurements are taken when the battery is fully relaxed, i.e. when the battery chemistry reaches a steady state after a charging or discharging current has terminated. In one embodiment, a controller is configured to determine if the battery is relaxed based on a stored battery profile and/or battery relaxation timer. If the battery is not relaxed, charging or power withdrawal from the traction battery is delayed to improve battery measurement accuracy. The controller may control a battery charger to stop current to/from the battery to ensure the battery is fully relaxed based on expiration of an associated relaxation time before sensing battery characteristics. The controller may be configured to immediately begin charging the fraction battery if the fraction battery is determined to be relaxed. The controller may be configured to store a battery profile for use in determining if the traction battery is fully relaxed. The controller may be configured to delay charging for a time period when the controller determines that the traction battery is not relaxed. When battery capacity information is not available in a memory operatively connected to the controller, the controller may estimate battery capacity after a relaxation time period has elapsed.

In a representative implementation, the controller estimates the battery capacity using a formula of $Ce = \int i dt / (SOC_1 - SOC_2)$, wherein $SOC_1$ is state of charge at a beginning of learning and $SOC_2$ is state of charge at an end of learning. The $SOC_1$ and $SOC_2$ may be separated in time by at least a minimum relaxation time to ensure the battery is in a relaxed state before the controller estimates the battery capacity. The controller may halt estimation of the battery capacity when battery temperature is below a battery temperature threshold.

Methods may be employed to perform any of the previously described features of the controller. For example, a method may include charging a traction battery if the battery is relaxed as determined by a stored battery profile or expiration of an associated relaxation time. If the battery is not relaxed, charging of the battery is delayed for the relaxation period. The method may include setting battery capacity based on the state of charge at the beginning of charging, charging current, and the state of charge at the end of charging. Charging may begin immediately if the traction battery is determined to be relaxed. The method may include storing a battery profile with a battery minimum relaxation time as a function of battery temperature. The method may set battery capacity after a time period has passed when the battery capacity information is not available in a vehicle memory.

In one example, battery capacity setting includes using a formula of $Ce = \int i dt / (SOC_1 - SOC_2)$, wherein $SOC_1$ is the state of charge at a beginning of charging and $SOC_2$ is the state of charge at the end of charging. The $SOC_1$ and $SOC_2$ may be separated in time by at least a minimum relaxation time to ensure the battery is in a relaxed state before setting the battery capacity. The method may include halting setting of the battery capacity when battery temperature is below a battery temperature threshold.

DETAILED DESCRIPTION

As required, detailed embodiments are disclosed herein; however, it is to be understood that the disclosed embodiments are merely representative examples that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Vehicles can be powered by battery electricity (BEVs) as well as by a combination of power sources including battery electricity. For example, hybrid electric vehicles (HEVs) are contemplated in which the powertrain is powered by both a traction battery and an internal combustion engine. In these configurations, the traction battery is rechargeable and a vehicle charger provides power to restore the traction battery after discharge.

Figure 1:
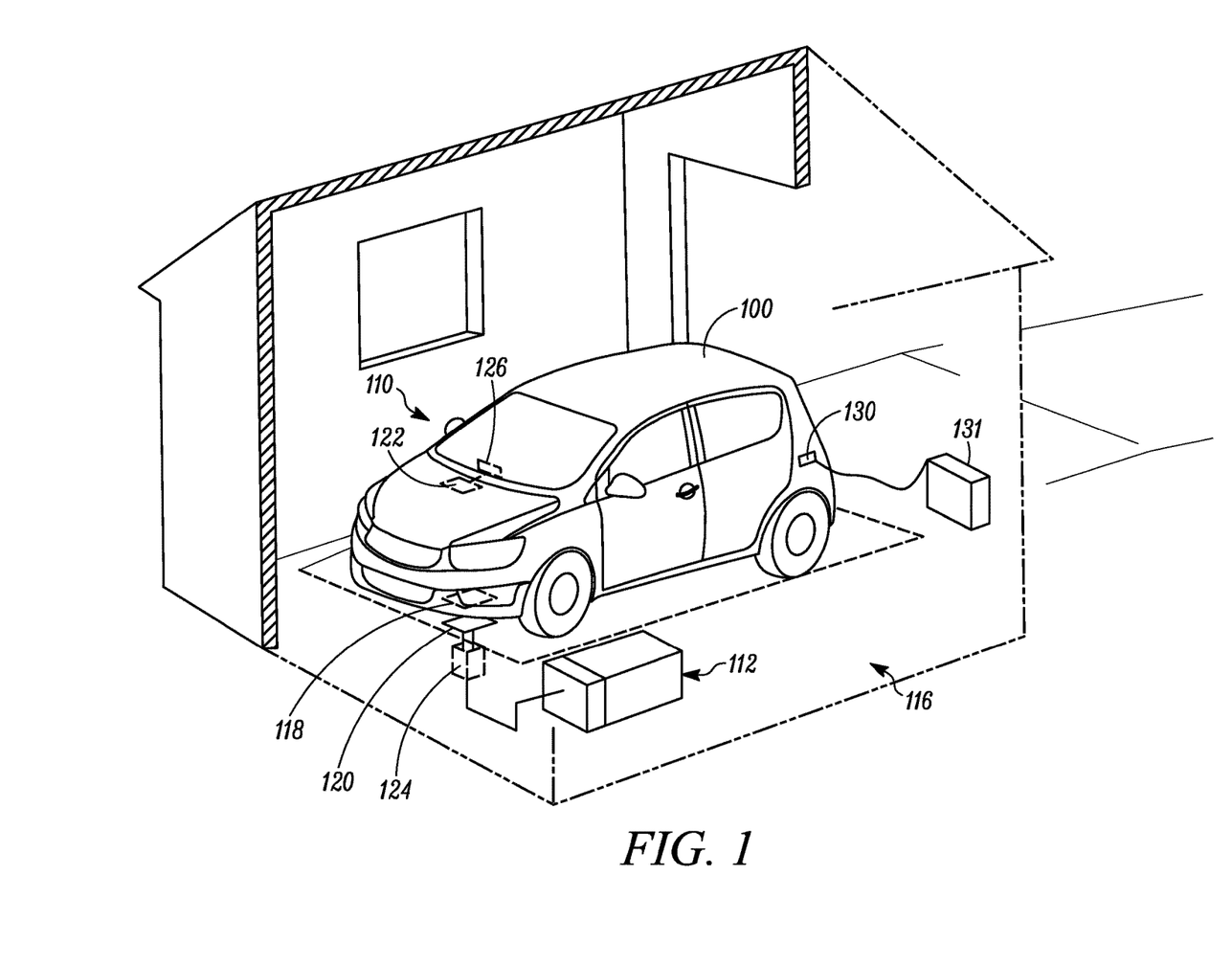
FIG. 1 is a schematic view of a vehicle at a charging station according to an example embodiment.

With reference to FIG. 1, a vehicle charging system is illustrated in accordance with one or more embodiments and is generally referenced by numeral 110. Wired or induction charging may be used to provide power from a vehicle charger 112 to a vehicle 100 to restore electrical power to the traction battery. In the representative embodiment illustrated, a charging station 116 is shown accommodating the vehicle 100 to be charged through induction charging. The vehicle 100 docks at the charging station 116, which houses the vehicle charger 112. The vehicle charger 112 can be connected to receive household electrical current, such as available within a typical home garage. The vehicle 100 may include a charging port 130 to which a charging cable from a charging station 131 may supply electricity to charge the traction battery.

The vehicle 100 includes a secondary coil housed within an induction charge plate 118 disposed on the underside of the vehicle 100. The vehicle secondary induction charge plate 118 is electrically connected to the vehicle battery. The vehicle 100 also includes an AC to DC power converter to rectify and filter the AC power received from the vehicle charger 112 into DC power to be received by the battery. The vehicle charger 112 is disposed in the floor beneath the vehicle 100, and includes a primary charging coil housed within a corresponding primary induction charging plate 120. The primary induction charging plate 120 is generally horizontal and positioned at a distance from the vehicle secondary induction charge plate 118. The primary induction charging plate 120 may be adjustable in height to create a suitable gap to facilitate charging of the vehicle 100. Electrical current is provided to the primary coil, which generates an electromagnetic field around the primary induction charging plate 120. When the vehicle secondary induction charge plate 118 is proximate to the powered primary induction charging plate 120, it receives power by being within the generated electromagnetic field. Current is induced in the secondary coil and subsequently transferred to the vehicle battery. The gap between the plates allows for variation in vehicle alignment, and also for accommodation of alternate authorized vehicles with differing ride heights.

In an alternative embodiment (not shown), the charging station primary induction charging plate is configured to be in a generally vertical position, for example on or near an upright wall. The vehicle would have a corresponding secondary induction charge plate on a front or rear vertical portion, for example as part of a front or rear bumper. The primary and secondary induction charging plates come into proximity when the vehicle is driven to the charge station and parked in a designated charging position.

With continuing reference to FIG. 1, the vehicle 100 is provided with a controller 122. Although it is shown as a single controller, the vehicle controller 122 can include multiple controllers that are used to control multiple vehicle systems. For example, the vehicle controller 122 can be a vehicle system controller/powertrain control module (VSC/PCM). In this regard, the vehicle charging control portion of the VSC/PCM can be software embedded within the VSC/PCM, or it can be a separate hardware device. The vehicle controller 122 generally includes any number of microprocessors, ASICs, ICs, memory (e.g., FLASH, ROM, RAM, EPROM and/or EEPROM) and software code to co-act with one another to perform a series of operations. A microprocessor within the vehicle controller 122 further includes a timer to track elapsed time intervals between a time reference and selected events. Designated intervals are programmed such that the controller provides certain command signals and monitors designated inputs at selectable time intervals. The vehicle controller is in electrical communication with the vehicle battery, and receives signals that indicate the battery charge level. The vehicle controller 22 further communicates with other controllers over a wired vehicle connection using a common bus protocol (e.g., CAN), and may also employ wireless communication.

The vehicle charger 112 may be provided with a charger controller 124 having wireless communication capability. The charger controller 124 similarly has embedded software and is programmable to regulate power flow provided by the vehicle charger 112. Software included with the charger controller 124 also includes a timer to track elapsed time between designated events. Under selected conditions, or upon receipt of designated instructions, the charger controller 124 can enable, disable, or reduce power flow through the charger 112. The vehicle charger 112 is configured to receive signals indicative of charge instructions from the vehicle controller 122.

The vehicle controller 122 is configured to wirelessly communicate with the charger controller 124. The wireless communication can be accomplished through RFID, NFC, Bluetooth, or other wireless methods. In at least one embodiment, the wireless communication is used to complete an association procedure between the vehicle 100, and the vehicle charger 112 prior to initiating a charge procedure. The association procedure can include the vehicle controller 122 sending a signal to the charger controller 124 indicating a request for authentication. The controller 122 then receives a response signal from the charger controller 124, and uses the response signal to determine whether or not to grant an initial authenticated status to the vehicle charger 112. Authentication can be influenced by a number of designated factors including manufacturer, power ratings, security keys, and/or other authentication factors. Based on an appropriate response signal by the charger controller 124, the vehicle controller 122 determines an affirmative association between the vehicle 100 and the vehicle charger 112. Once an authenticated charger is detected, the vehicle controller 122 provides an initiation signal to the charger controller 124 to instruct the charge system to initiate a charge procedure. The initial wireless request and subsequent authentication response make up an association "handshake" between the two devices. The association also provides for further secure communication and command signals between the vehicle 100 and the vehicle charger 112. If no affirmative authentication response is received by the vehicle controller 122, a command signal may be provided to prevent charging.

The vehicle controller 122 may be further configured to cause the generation of a plurality of alert signals. The vehicle 100 may be provided with a user display 126 inside the passenger compartment. The user display 126 serves as an alert mechanism to an operator. The controller 122 can cause the generation of a number of different in-vehicle display messages. For example, a display alert may be generated to indicate that an enhanced learning for battery capacity is being launched. The enhanced learning alert may inform the operator that battery charging will be delayed for a battery relaxation time. Other types of alerts may be provided, such as a light or illuminated graphic symbol, for example, depending on the particular application and implementation.

As previously described, battery capacity may be used for various monitoring and control functions of the battery monitoring system. Battery capacity determines how much energy is stored in the battery, and thus determines the electric-only or EV range for an electrified vehicle. Battery capacity can change as the battery ages, particularly when the battery is intensively used in PHEV/BEV applications. Therefore, it is desirable to provide a method or system that learns or adapts to the battery capacity value over time. However, accuracy of battery measurements used in determining battery capacity may be affected by the timing of the measurements relative to changes in battery charging/discharging current due to associated changes in battery chemistry.

Battery capacity may be learned or calculated according to:

$$Ce = \frac{\int i\,dt}{SOC_1 - SOC_2} \qquad \text{Eq. 1}$$

where $SOC_1$ is the initial state of charge (SOC) to start capacity learning (i.e., the SOC right before the ampere*hour integration collection in the numerator) and $SOC_2$ is the final SOC to complete battery capacity learning (i.e., the SOC right after the ampere*hour integration collection in the numerator). Battery capacity learning using Eq. 1 may be applied when the vehicle is driving (e.g., charge depletion mode in PHEVs) and entry conditions are met, or when the battery is charged from the power grid. Representative entry conditions may include the difference between $SOC_1$ and $SOC_2$ is larger than 40%, the driving time to have the larger than 40% change in SOC is not longer than 1 hour, etc.

The open circuit voltage is an accurate indicator of battery SOC for lithium-ion batteries, which are often used as vehicle traction batteries. As such, $SOC_1$ and $SOC_2$ may be estimated from battery cell voltage. Open circuit voltage measurements should be made when the battery is fully relaxed for best accuracy. However, operator usage patterns and associated battery controls for PHEVs and BEVs may not facilitate measurements and capacity determinations based on a fully relaxed traction battery. For example, an operator of the vehicle may drive the vehicle and arrive at the charging station 116. The vehicle 100 is either aligned with the wireless charging system or immediately plugged in to the wired charging system 131. In another use case, the vehicle is being charged and the operator immediately begins driving the vehicle after disconnecting from the charging system, e.g., driving away from the wireless charger or unplugging the vehicle from the wired charging system 131 and immediately driving the vehicle. In these use cases, the traction battery chemistry may not have sufficient time to reach a steady state, i.e. the battery is not fully relaxed, and the estimated capacity of the traction battery may be inaccurate if based on measurements obtained before the battery is fully relaxed.

Figure 2:
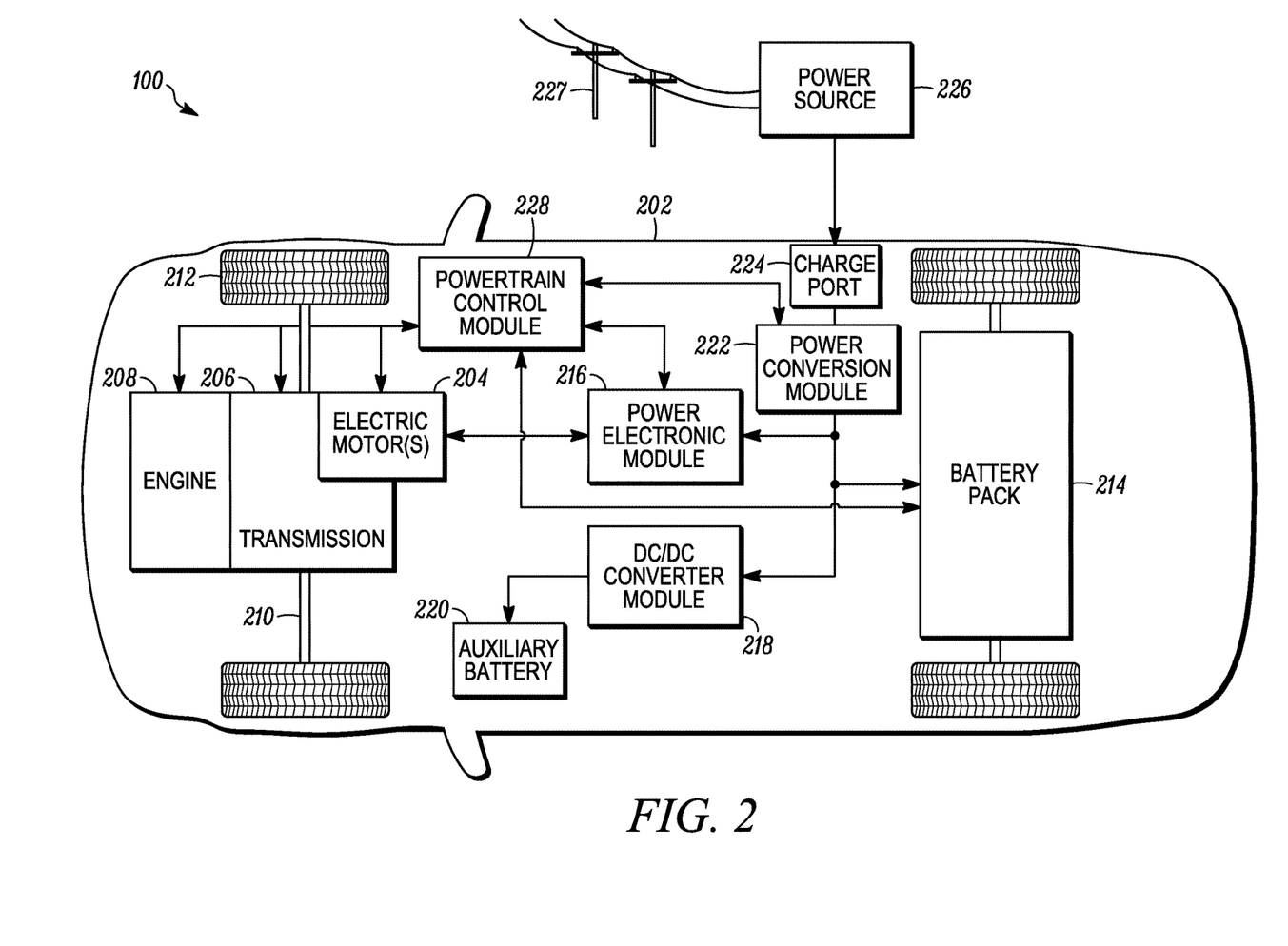
FIG. 2 is a schematic view of a vehicle according to an example embodiment.

FIG. 2 depicts an example of an electric vehicle, e.g., a plug-in hybrid electric vehicle. A plug-in hybrid-electric vehicle 202 may comprise one or more electric motors 204 mechanically connected to a hybrid transmission 206. In addition, the hybrid transmission 206 is mechanically connected to an engine 208, for example an internal combustion engine. The hybrid transmission 206 may also be mechanically connected to a drive shaft 210 that is mechanically connected to the wheels 212. The electric motors 204 can provide propulsion when the engine 208 is turned off, and can provide deceleration capability when the engine 208 is turned on. The electric motors 204 may be configured as generators and can provide fuel economy benefits by recovering energy that would normally be lost as heat in the friction braking system.

The traction battery 214 stores energy that can be used by the electric motors 204. A vehicle battery pack 214 typically provides a high voltage DC output. The traction battery 214 may include a battery pack with multiple cells. The traction battery may be implemented by a rechargeable battery, e.g., a lead-acid, NiCd, nickel metal hydride, lithium ion, Li-ion polymer, and, less commonly, zinc-air and molten salt batteries, for example.

The battery 214 is electrically connected to a power electronics module 216. The power electronics module 216 is also electrically connected to the electric motors 204 and provides the ability to bi-directionally transfer energy between the battery 214 and the electric motors 204. For example, a battery 214 may provide a DC voltage while the electric motors 204 may require a three-phase AC current to function. The power electronics module 216 may convert the DC voltage to a three-phase AC current as required by the electric motors 204, for example, by using an inverter module. In a regenerative mode, the power electronics module 216 will convert the three-phase AC current from the electric motors 204 acting as generators to the DC voltage required by the battery 214, also using an inverter module or other circuitry. The methods described herein are equally applicable to a pure electric vehicle or any other device or vehicle using a battery pack.

During vehicle operation or when charging from a power source, the battery is in an active state with a charging or discharging current flowing to/from the battery that creates gradients in the battery chemistry. Measurements of battery characteristics, such as open circuit voltage, are affected in varying degrees by these gradients. The battery 214 transitions to a relaxed state where the chemistry has reached a steady state after a period of time during which no current flows to or from the battery. As previously described, open circuit voltage measurements used to determine battery SOC are more accurate when obtained after the battery chemistry has reached steady state for the current conditions and battery age, e.g. when the battery is fully relaxed. The relaxation time needed for the battery chemistry to reach steady state and the battery to be fully relaxed may vary based on the SOC of the battery, the temperature, and the battery chemistry, for example. One or more battery profiles may be stored in memory and used to determine an associated battery relaxation time or period in response to current battery and ambient conditions.

In addition to providing energy for propulsion, the battery 214 may provide energy for other vehicle electrical systems. Such a system may include a DC/DC converter module 218 that converts the high voltage DC output of the battery pack 214 to a low voltage DC supply that is compatible with other vehicle loads. Other high voltage loads, such as compressors and electric heaters, may be connected directly to the high-voltage bus from the battery 214. In a vehicle, the low voltage systems may be electrically connected to a 12V battery 220. An all-electric vehicle may have a similar architecture but without the engine 208. Power provided by the traction battery 214 for electric accessories places the battery 214 in an active or non-relaxed state.

The battery 214 may be recharged by an external power source 226. The external power source 226 may provide AC or DC power to the vehicle 202 by electrically connecting through a charge port 224. The charge port 224 may be any type of port configured to transfer power from the external power source 226 to the vehicle 202. The charge port 224 may be electrically connected to a power conversion module 222. The power conversion module 222 may condition the power from the external power source 226 to provide the proper voltage and current levels to charge the battery 214. The functions of the power conversion module 222 may reside in the external power source 226 in some applications. The vehicle engine, transmission, electric motors, battery, power conversion and power electronics may be controlled by a powertrain control module (PCM) 228. As previously described, current flows to the battery during charging, which places the battery 214 in an active state. The battery 214 transitions to a relaxed state after a period of time during which no current flows to or from the battery 214. Battery capacity learning according to various embodiments of the present disclosure measures the open circuit voltage when the battery is relaxed to more accurately determine the state of charge (SOC). A stored battery profile may be used to determine an appropriate relaxation time corresponding to current battery and/or ambient conditions that may include battery SOC, temperature, and the particular type of battery chemistry.

In addition to illustrating a plug-in hybrid vehicle, FIG. 2 is representative of a battery electric vehicle (BEV) if engine 208 is removed. Likewise, FIG. 2 can illustrate a traditional hybrid electric vehicle (HEV) or a power-split hybrid electric vehicle if components 222, 224, and 226 are removed. FIG. 2 also illustrates the high voltage system which includes the electric motor(s), the power electronics module 216, the DC/DC converter module 218, the power conversion module 222, and the battery 214. The high voltage system and battery include high voltage components including bus bars, high voltage connectors, high voltage wires, and circuit interrupt devices. These high voltage components contribute to the resistance of the battery.

Figure 3:
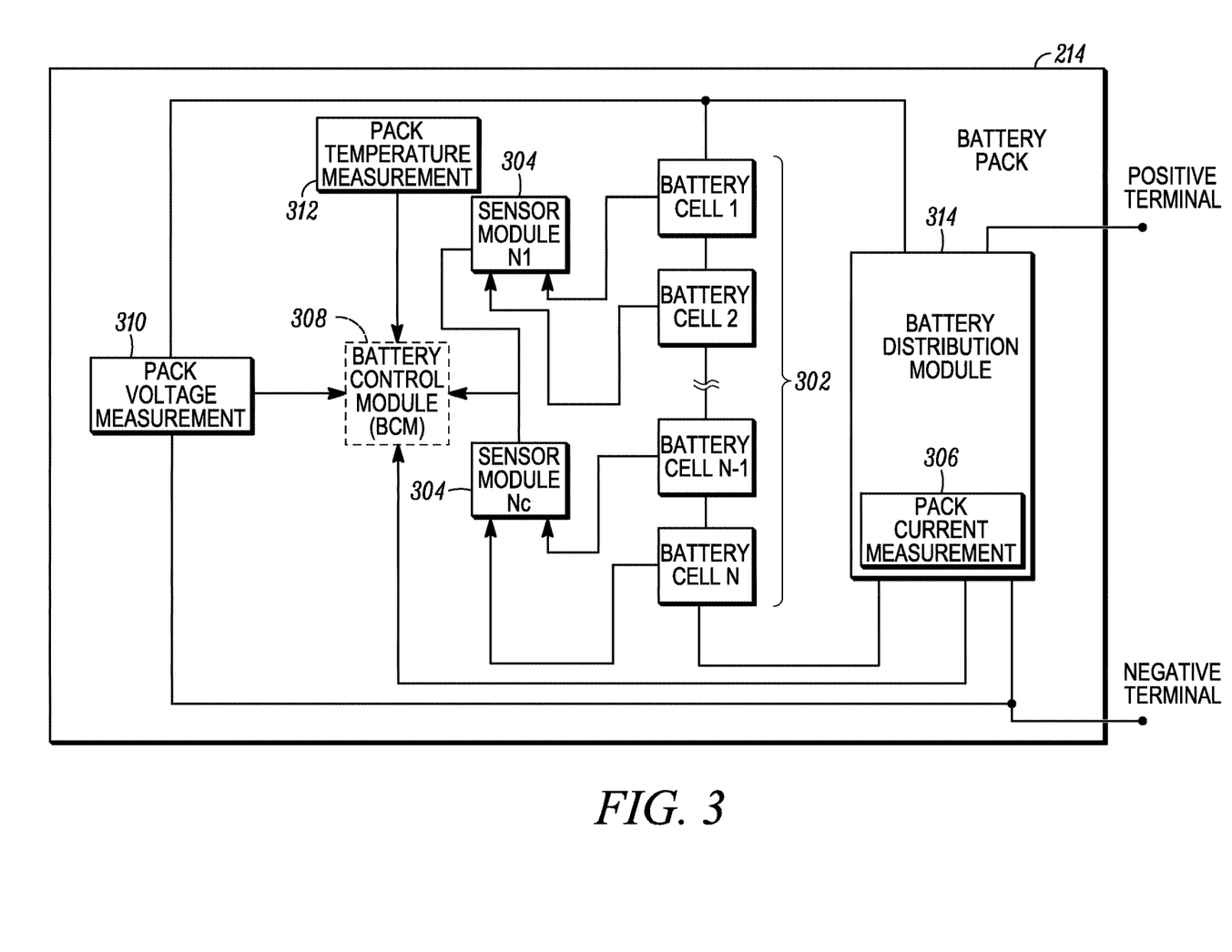
FIG. 3 is a schematic view of a communication including a vehicle according to an example embodiment.

FIG. 3 shows a battery pack 214 in a simple series configuration of N battery cell modules 302. The battery cell modules 302 may contain a single battery cell or multiple battery cells electrically connected in parallel. The battery pack, however, may be composed of any number of individual battery cells and battery cell modules connected in series or parallel or some combination thereof. Each of the cells has an internal battery resistance. A system may have one or more controllers, such as a Battery Control Module (BCM) 308 that monitor and control the performance of the battery pack 214. The BCM 308 may monitor several battery pack level characteristics such as pack current measured by a current sensor 306, pack voltage 310 and pack temperature 312. The current sensor 306 may be used to determine whether current is flowing to/from the battery, e.g. when the battery is in an active state. An active state may be determined when current exceeds a corresponding nonzero threshold.

In addition to the pack level characteristics, the system may monitor and control battery cell level characteristics. For example, the terminal voltage, current, and temperature of each cell or a representative subset of cells may be measured. A system may use a sensor module 304 to measure the characteristics of one or more battery cell modules 302. The characteristics may include battery cell voltage, temperature, age, number of charge/discharge cycles, etc. In an example, a sensor module will measure battery cell voltage. Battery cell voltage may be voltage of a single battery or of a group of batteries electrically connected in parallel or in series. The battery cell voltage may be, at least in part, based on the electrical connections connecting the cells to each other and to other components. The battery 214 may utilize up to $N_c$ sensor modules 304 to measure the characteristics of a representative sample or all of the battery cells 302. Each sensor module 304 may transfer the measurements to the BCM 308 for further processing and coordination. The sensor module 304 may transfer signals in analog or digital form to the BCM 308. The battery 214 may also contain a battery distribution module (BDM) 314 which controls the flow of current into and out of the battery 214.

Figure 4:
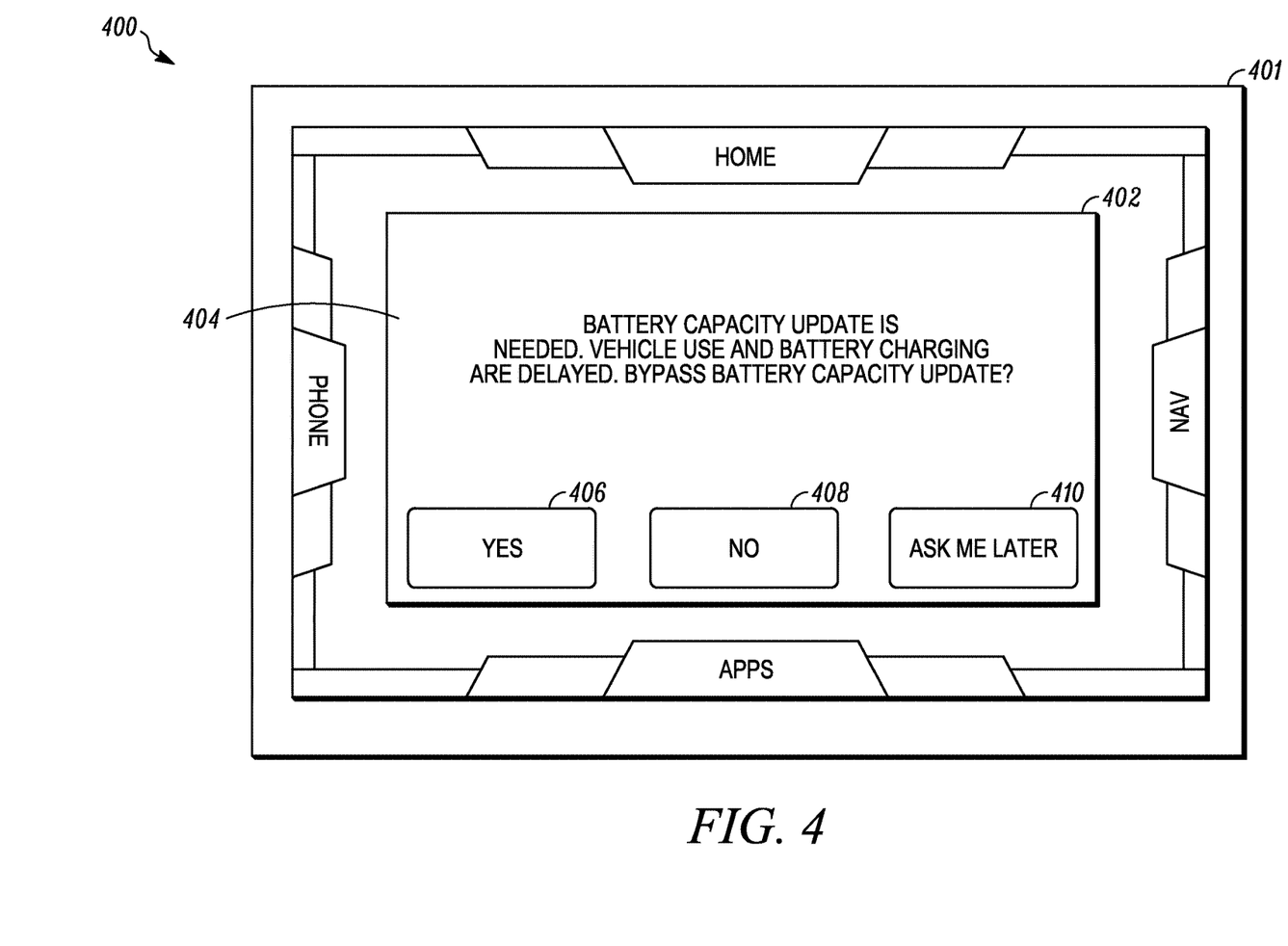
FIG. 4 is view of a vehicle interface according to an example embodiment.

FIG. 4 illustrates a representative user interface 400 of the vehicle 100 for communicating to the operator the status of the vehicle status, including the SOC, the charging status, battery current, the relaxation state of the battery, and the like. The user interface 400 may also inform the operator of a delay in providing current to or from the battery to facilitate an enhanced battery capacity determination according to embodiments of the present disclosure. The user interface 400 may be presented by a vehicle control system in the vehicle 100 via a display 401 (e.g., a touch screen or an LCD display). The user interface 400 may include a message prompt 402 that informs the operator that an enhanced battery capacity determination is recommended. The operator may be allowed to postpone or cancel the determination via the user interface depending on the particular application and implementation. In some implementations, the message may be advisory only and not allow the vehicle operator to interrupt the process. As illustrated, the message prompt 402 is included in the user interface 400 as a message above other content of the user interface 400. It should be noted that in other examples, the message prompt 402 may be provided in other forms, such as via a full-screen user interface, a light, or illuminated graphic, for example.

The user interface 400 may further include controls 406, 408, 410 configured to receive an indication from the user whether the user agrees to allow the vehicle time for the battery to relax to update the battery capacity. As an example, the user interface 400 may include a yes control 406 for receiving an indication from the user that the user agrees to the battery capacity update, a no control 408 for receiving an indication from the user that the user disagrees to a battery capacity update, and an ask-me-later control 410 for delaying the battery capacity update to a later date or later time.

The user interface 400 may also be used to indicate to the user via the display 401 that a battery capacity update is suggested or has been successfully completed. The user interface 400 can indicate to the user that the battery capacity update will be launched on the next appropriate time period when the battery is in a relaxed state. The user interface 400 can also provide a user with input controls to cause a module in the vehicle to launch the battery capacity update.

Figure 5:
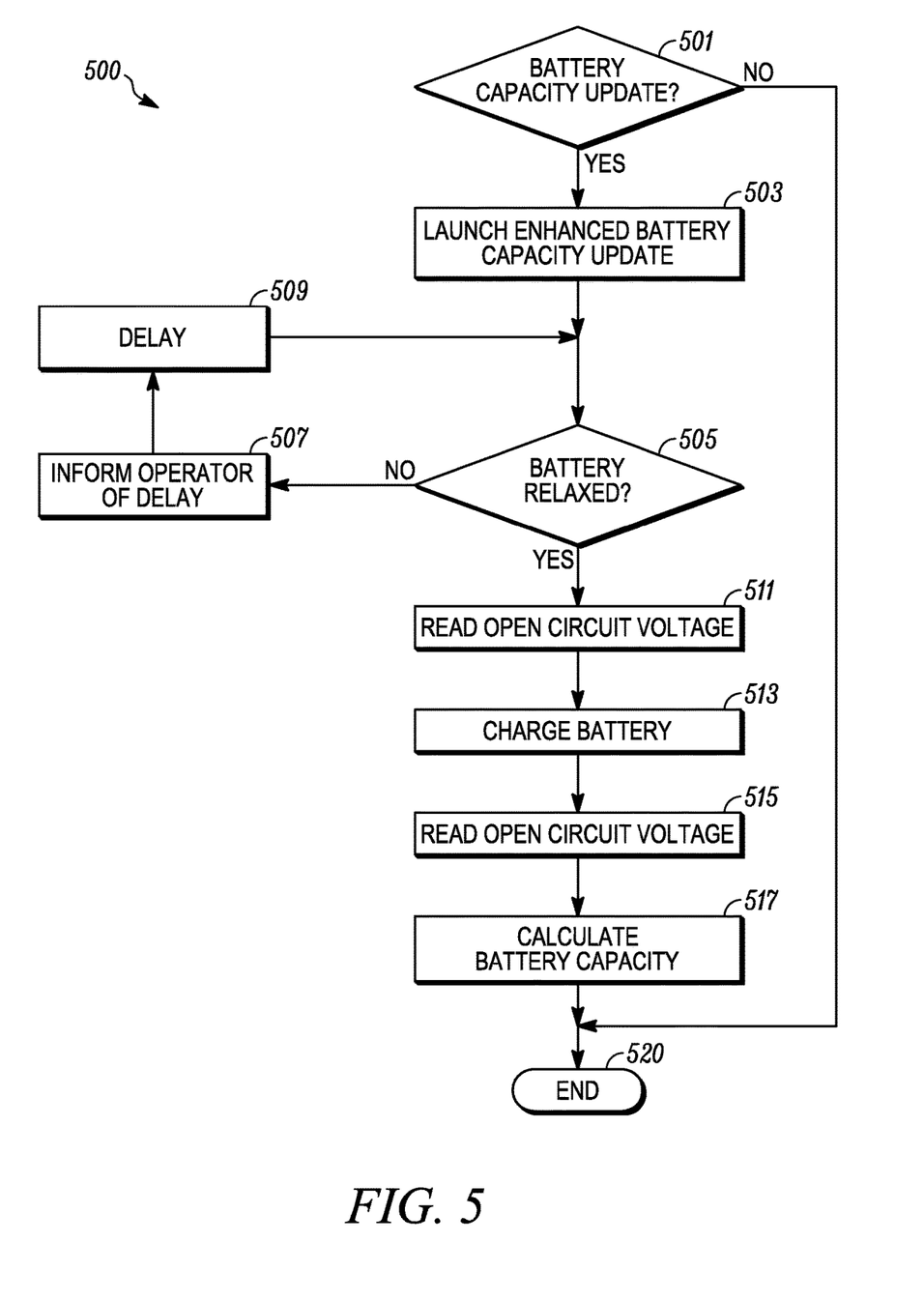
FIG. 5 is flow chart showing a method according to an example embodiment.

FIG. 5 illustrates operation of a system or method 500 for updating the traction battery capacity for an electric or electric-assist vehicle. Battery capacity is a parameter used in the traction battery monitoring system. For example, the battery capacity is used in generating an accurate estimation of state of charge (SOC), which may be provided as a percentage of the battery capacity, for example, based on a voltage measurement. Battery capacity is also used in the vehicle to determine how much energy is stored in the battery, and thus determines the range for the vehicle when powered only by the battery. However, battery capacity may change with operating conditions and age as previously described. Therefore, a method and a system to learn capacity value over time can be used in an electric vehicle. The battery capacity can be learned through Eq. 1 as set forth above.

At 501, the vehicle determines that a battery capacity update is desired. The vehicle can be instructed from an external controller to start the battery capacity update by a corresponding message or flag stored in memory. In one example, the vehicle determines that its battery capacity should be updated. Various triggers may indicate to the vehicle that the battery capacity should be updated. In one embodiment, the BECM may determine that a reported value of battery capacity, SOC, and/or open circuit voltage diverge from expected values based on associated diagnostic routines. The vehicle may update battery capacity based on passage of a time period. The time period may vary depending on the various factors, such as battery age, number of charge/discharge cycles, etc. In one example, the battery control module may maintain a timer to record how long it has been since the battery capacity has been updated. The BECM may set a threshold that is shorter at the battery beginning of life and end of life where more variation is expected. Another trigger for battery capacity can be corruption or loss of a stored battery capacity, such as when the battery or control module is replaced, for example.

The present enhanced capacity learning may be performed while the vehicle is in an on-plug or inductive charging process as opposed to being charged from regenerative braking or from the internal combustion engine, for example. If the vehicle is not in an on-plug or inductive charging process, then the method 500 may proceed to the end 520. Otherwise, if a battery capacity update is desired as indicated at 501 and the battery is ready for charging from a plug or inductive charging system, the enhanced battery capacity update or learning routine is launched as indicated at 503. The battery capacity update may be launched after the operator drives the vehicle and then parks the vehicle at a charging location within proximity of an inductive charging station or plugs in the vehicle.

The BECM or another vehicle controller determines if the battery is fully relaxed at 505. As previously described, battery relaxation is related to battery chemistry approaching steady state or equilibrium after battery current falls to zero or near zero, such as on the order of milliamps, for example. The relaxation time may depend on a number of factors, such as the battery current prior to relaxation (higher current may require longer relaxation time), battery temperature, battery cell voltage, battery age, number of charge and/or discharge cycles, etc. In one example, battery cell voltage relaxed to a value within 90% of its final stable value within 5 seconds. The battery may be determined to be fully relaxed based on empirical data and a corresponding threshold, such as 90% or 95% of a final value. The empirical data and corresponding threshold may be captured in a battery profile or lookup table stored in memory and accessed by one or more battery, vehicle, or ambient parameters, such as battery temperature and last battery current, for example, to determine an associated battery relaxation time. Different thresholds may be used to determine the degree of battery relaxation, such as 80% of final voltage value corresponding to partially relaxed and 95% of its final voltage value corresponding to being fully relaxed, for example. If the elapsed time from battery current being zero or below a minimum threshold is greater than a minimum battery relax time (e.g., multiple minutes, or up to tens of minutes), then the battery is considered to be completely relaxed.

As previously described, open circuit voltage measurements may be used to derive SOC parameters that may in turn be used to determine battery capacity according to Eq. 1. The values for $SOC_1$ and $SOC_2$ may be estimated from the battery cell open circuit voltage, which is measured or otherwise determined after the battery is determined to be fully relaxed at 505. In one embodiment, the BECM or another controller determines that the battery is fully relaxed based on expiration of a relaxation time triggered in response to battery current falling below a corresponding threshold. The relaxation time may be determined from a stored battery profile or lookup table accessed by battery, vehicle, and/or ambient operating parameters such as battery current, battery temperature, ambient temperature, cell voltage, etc.

If the battery relaxation period specified by the battery profile and current operating conditions has not yet expired such that the battery is not fully relaxed as determined at 505, the vehicle may inform the operator via a communication, e.g., the display 400, that the charging or other operation of the vehicle will be delayed to facilitate the enhanced battery capacity calculation. In various embodiments, the operator may bypass the update or confirm the battery capacity update. Embodiments may also include an advisory message that does not allow the operator to abort or delay the update via the display or other user interface. In one embodiment, the message to the operator is "Enhanced capacity learning is about to run. Charging will start in xx seconds". Similar informational messages may be provided. For example, display 400 may indicate "Battery diagnostics being performed and will complete soon." The message conveys to the operator that a delay in charging or availability of battery operated accessories will occur.

Battery current for charging or discharging may be delayed as represented at 509 for a battery relaxation period to allow the battery chemistry to stabilize and to perform the enhanced battery capacity determination. Battery charging, including trickle charging, is delayed for the relaxation period and the process returns to step 505 to determine whether the battery relaxation period has expired indicating that the battery is fully relaxed. Various programmable charging features may allow complete battery relaxation without advising the operator. For example, battery charging may be programmed to occur during overnight hours to take advantage of favorable electricity rates. In this case, the enhanced battery capacity determination may be initiated at a predetermined time before scheduled battery charging begins, or subsequent to completion of scheduled battery charging.

The enhanced battery capacity learning can begin when the battery is fully relaxed as indicated at 505. The battery open circuit voltage may be determined as indicated at 511 to provide an accurate value for $SOC_1$ based on a predetermined relationship stored in memory. The battery control module will then close the charging contactors and initiate battery charging as represented at 513 and calculate the current integration expressed in the numerator of Eq. 1. To minimize the error in current integration, ∫idt, the maximal available charging power that the charger can provide is used as shorter charging time results in smaller accumulated current integration error. The charge energy flows into the battery until the battery reaches the battery charge voltage threshold and the charging process stops. The battery charge voltage threshold varies with different battery types and may be stored in memory associated with one or more vehicle processors.

After the battery is charged, the battery control module reads the previously stored $SOC_1$ and ∫idt from an associated non-volatile memory. The open circuit voltage is again measured and a value for $SOC_2$ is obtained from a stored relationship or lookup table for open circuit voltage and SOC based on the open circuit voltage measurement. With these parameters, the battery capacity is then calculated, e.g., using Eq. 1 at 517. Thereafter, the process ends at 520.

There are various scenarios where the battery may be unplugged or the charging process is terminated prior to completion of the battery capacity determination. In such scenarios, the battery capacity learning is automatically terminated. If the battery capacity learning is terminated, the battery control module will reset the process and will attempt to update the battery capacity at a later time based on the previously described entry conditions being satisfied. In another example, the battery control module may reject the battery capacity update if the open circuit voltage-based $SOC_2$ is smaller than a predefined value after the battery is fully charged. Similarly, the battery control module may reject the battery capacity update if the open circuit voltage-based $SOC_1$ is greater than a predefined value before battery is charged. As battery capacity may be a function of temperature, the process may be terminated if the battery temperature is below a temperature threshold, for example.

While exemplary embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments within the scope of the claims that are not explicitly illustrated or described.

What is claimed is:

1. A vehicle comprising:
a traction battery;
a charger to charge the traction battery; and
a controller configured to control the charger to delay traction battery charging for a battery relaxation period beginning with battery current falling below a threshold, and to measure a first open circuit voltage of the traction battery after the battery relaxation period and before resuming traction battery charging to update a battery capacity value using the first open circuit voltage;
wherein the controller is configured to retrieve a stored value for the battery relaxation period based on battery temperature, age of the traction battery, and a state of charge (SOC) of the traction battery.

2. The vehicle of claim 1, wherein the controller is configured to retrieve a stored battery profile to determine the battery relaxation period.

3. The vehicle of claim 1, wherein the controller is configured to measure a second open circuit voltage after traction battery charging has completed and to update the battery capacity value based on the first and second open circuit voltage measurements.

4. The vehicle of claim 1, wherein the controller is configured to update the battery capacity value based on a first battery state of charge associated with the first open circuit voltage.

5. The vehicle of claim 1, wherein the controller updates the battery capacity value in response to previously stored battery capacity information being unavailable.

6. The vehicle of claim 1, wherein the controller is configured to update the battery capacity using a formula of $Ce=\int i dt/(SOC_1-SOC_2)$, wherein $SOC_1$ is state of charge at a beginning of learning a traction battery state and $SOC_2$ is state of charge at an end of learning the traction battery state; and wherein the controller measures $SOC_1$ and $SOC_2$.

7. The vehicle of claim 6, wherein the controller measures a second open circuit voltage after a second battery relaxation period that begins in response to completion of the traction battery charging, and determines $SOC_2$ based on the second open circuit voltage.

8. The vehicle of claim 1, wherein the controller halts the update of the battery capacity value in response to battery temperature being below a battery temperature threshold.

9. A method comprising:
retrieving, by a vehicle processor, first and second battery relaxation periods from a memory associated with the vehicle processor, the first and second battery relaxation periods stored in a battery profile as a function of battery temperature, age of the traction battery and a state of charge (SOC) of a traction battery;
measuring, by the vehicle processor, first and second traction battery open circuit voltages before and after charging of the traction battery, respectively, the first and second open circuit voltages measured after expiration of the associated first and second battery relaxation periods beginning at a battery current threshold; and
setting battery capacity based on accumulated battery charging current and first and second states of charge corresponding to the first and second open circuit voltages, respectively.

10. The method of claim 9, further comprising charging the traction battery after expiration of the first battery relaxation period.

11. The method of claim 9, wherein setting the battery capacity occurs in response to battery capacity information being unavailable in a vehicle memory.

12. The method of claim 9, wherein setting the battery capacity comprises setting the battery capacity according to $Ce=\int i dt/(SOC_1-SOC_2)$, where $SOC_1$ is a first state of charge associated with the first open circuit voltage and $SOC_2$ is a second state of charge associated with the second open circuit voltage.

13. A vehicle comprising:
a traction battery;
a charger coupled to the traction battery; and
a controller programmed to update battery capacity based on a first SOC associated with battery open circuit voltage measured after expiration of a first battery relaxation period before battery charging and a second SOC associated with battery open circuit voltage measured after expiration of a second battery relaxation period after battery charging and an accumulated battery charging current, the controller is to update the battery capacity according to $Ce=\int i dt/(SOC_1-SOC_2)$;
wherein the controller is further programmed to retrieve the first and second battery relaxation periods from memory based on battery temperature, age of the traction battery and a state of charge (SOC) of the traction battery.

14. The vehicle of claim 13, the controller further programmed to delay battery charging after battery current falls below a corresponding current threshold for the first battery relaxation period.

15. The vehicle of claim 14 further comprising a display screen in communication with the controller, the controller further programmed to generate a message for display on the display screen in response to the delay.

16. The vehicle of claim 13, wherein the first and second relaxation periods are based on battery age and begin when battery current falls below a current threshold.

* * * * *